(12) United States Patent
Choi

(10) Patent No.: US 8,190,548 B2
(45) Date of Patent: May 29, 2012

(54) SYSTEMS, DEVICES, AND METHODS FOR ANALOG PROCESSING

(75) Inventor: Vicky Choi, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 861 days.

(21) Appl. No.: 12/266,378

(22) Filed: Nov. 6, 2008

(65) Prior Publication Data

US 2009/0121215 A1    May 14, 2009

Related U.S. Application Data

(60) Provisional application No. 60/986,554, filed on Nov. 8, 2007.

(51) Int. Cl.
*G06F 17/00*    (2006.01)
*G06N 5/02*    (2006.01)

(52) U.S. Cl. .......... 706/46

(58) Field of Classification Search .......... 977/933
See application file for complete search history.

(56) References Cited

U.S. PATENT DOCUMENTS

| | | | | |
|---|---|---|---|---|
| 6,838,694 | B2 | 1/2005 | Esteve et al. | 257/34 |
| 7,335,909 | B2 | 2/2008 | Amin et al. | 257/34 |
| 2005/0082519 | A1 | 4/2005 | Amin et al. | 257/13 |
| 2005/0256007 | A1* | 11/2005 | Amin et al. | 505/170 |
| 2006/0142154 | A1 | 6/2006 | Wolff | 502/416 |
| 2006/0225165 | A1* | 10/2006 | Maassen van den Brink et al. | 977/933 |
| 2008/0176750 | A1 | 7/2008 | Rose et al. | 505/170 |

OTHER PUBLICATIONS

'Minor embedding in adiabatic quantum computation: I. The parameter setting problem': Choi, 2008, Quantum Inf Process (2008) 7:193-209.*
'Preprocessing of unconstrained quadratic binary optimization': Boros, 2006, Rutcor research report.*
'Local search heuristics for quadratic unconstrained binary optimization (QUBO)': Boros, Feb. 21, 2007, Springer, Springer science and Business Media.*
U.S. Appl. No. 11/247,857, filed Oct. 10, 2005, Thom et al.
U.S. Appl. No. 12/017,995, filed Jan. 22, 2008, Harris.
U.S. Appl. No. 12/238,147, filed Sep. 25, 2008, Amin.
Amin et al., "Decoherence in Adiabatic Quantum Computation," arXiv:0708.0384v1 [condmat.mes-hall], pp. 1-4, Aug. 2, 2007.
Allen et al., "Blue Gene: A Vision for Protein Science Using a Petaflop Supercomputer," *IBM Systems Journal* 40(2):310-327, 2001.
Blatter et al., "Design aspects of superconducting-phase quantum bits," *Physical Review B* 63:174511-1-174511-9, 2001.
Dolan et al., "Optimization on the NEOS Server," *SIAM News* 35(6): 5 pages, Jul./Aug. 2002.
Farhi et al., "Quantum Adiabatic Evolution Algorithms versus Simulated Annealing," MIT-CTP #3228, arXiv:quant-ph/0201031 v1, pp. 1-16, Jan. 8, 2002.

(Continued)

*Primary Examiner* — Kakali Chaki
*Assistant Examiner* — Peter Coughlan
(74) *Attorney, Agent, or Firm* — Seed IP Law Group PLLC

(57) ABSTRACT

A system employs a plurality of physical qubits, each having a respective bias operable to up to six differentiable inputs to solve a Quadratic Unconstrained Binary Optimization problem. Some physical qubit couplers are operated as intra-logical qubit couplers to ferromagnetically couple respective pairs of the physical qubits as a logical qubit, where each logical qubit represents a variable from the Quadratic Unconstrained Binary Optimization problem. The logical qubits may include two or more physical qubits.

24 Claims, 5 Drawing Sheets

OTHER PUBLICATIONS

Feynman, "Simulating Physics with Computers," *International Journal of Theoretical Physics* 21(6/7):467-488, 1982.

Fourer et al., "Optimization as an Internet Resource," *Interfaces* 31(2):130-150, Mar./Apr. 2001.

Friedman et al., "Quantum superposition of distinct macroscopic states," *Nature 406*:43-46, Jul. 6, 2000.

Harris et al., "Sign and Magnitude Tunable Coupler for Superconducting Flux Qubits," arXiv:cond-mat/0608253 v1, Aug. 11, 2006.

Il'ichev et al., "Continuous Monitoring of Rabi Oscillations in a Josephson Flux Qubit," *Physical Review Letters 91*(9):097906-1-097906-4, week ending Aug. 29, 2003.

Johnson et al., "What are the Least Tractable Instances of Max Independent Set?," Proceedings of the Tenth Annual ACM-SIAM Symposium on Discrete Algorithms, S927-S928, 1999.

Koch et al., "Model for 1/F Flux Noise in SQUIDs and Qubits," *Physical Review Letters 98*(26), 16 pages, 2007.

Maassen van den Brink et al., "Mediated tunable coupling of flux qubits," *New Journal of Physics 7*:1-18, 2005.

Makhlin et al., "Quantum-State Engineering with Josephson-Junction Devices," *Reviews of Modern Physics 73*(2):357-400, Apr. 2001.

Mooij et al., "Josephson Persistent-Current Qubit," *Science 285*:1036-1039, Aug. 13, 1999.

Nielsen et al., *Quantum Computation and Quantum Information*, Cambridge University Press, Cambridge, 2000, "7.8 Other implementation schemes," pp. 343-345.

Orlando et al., "Superconducting Persistent-Current Qubit," *Physical Review B 60*(22):15 398-15 413, Dec. 1, 1999.

Shirts et al., "Computing: Screen Savers of the World Unite!," *Science 290*(5498):1903-1904, Dec. 8, 2000.

Shnirman et al., "Low- and High-Frequency Noise from Coherent Two-Level Systems," *Physical Review PRL 94*(12) 4 pages, Apr. 1, 2005.

Shor, "Introduction to Quantum Algorithms," AT&T Labs—Research, arXiv:quant-ph/0005003 v2, pp. 1-17, Jul. 6, 2001.

"Primer—A High-Level Look at Optimization: Past, Present and Future," e-Optimization.Community , e-Optimization.com, 5 pages, 2000.

\* cited by examiner

SYSTEMS, DEVICES, AND METHODS FOR ANALOG PROCESSING

CROSS REFERENCE TO RELATED APPLICATIONS

This application claims benefit under 35 U.S.C. 119(e) of U.S. Provisional Patent Application Ser. No. 60/986,554, filed Nov. 8, 2007, entitled "Systems, Devices, and Methods for Analog Processing", which is incorporated herein by reference in its entirety.

BACKGROUND

1. Field

This disclosure generally relates to analog computing and analog processors, for example, quantum computing and quantum processors.

2. Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation, involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi et al., "Quantum Adiabatic Evolution Algorithms versus Simulated Annealing" arXiv.org:quant-ph/0201031 (2002), pp 1-24.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle = a|0\rangle + b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regaining its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar in some respects to those used for conventional integrated circuits.

Superconducting qubits are a type of superconducting device that can be included in a superconducting integrated circuit. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. No. 6,838,694 and U.S. Patent Application No. 2005-0082519.

Computational Complexity Theory

In computer science, computational complexity theory is the branch of the theory of computation that studies the resources, or cost, of the computation required to solve a given computational problem. This cost is usually measured in terms of abstract parameters such as time and space, called computational resources. Time represents the number of steps required to solve a problem and space represents the quantity of information storage required or how much memory is required.

Computational complexity theory classifies computational problems into complexity classes. The number of complexity classes is ever changing, as new ones are defined and existing ones merge through the contributions of computer scientists. The complexity classes of decision problems include:

1. P—The complexity class containing decision problems that can be solved by a deterministic UTM using a polynomial amount of computation time;

2. NP ("Non-deterministic Polynomial time")—The set of decision problems solvable in polynomial time on a non-deterministic UTM. Equivalently, it is the set of problems that can be "verified" by a deterministic UTM in polynomial time;

3. NP-hard (Nondeterministic Polynomial-time hard)—A problem H is in the class NP-hard if and only if there is an NP-complete problem L that is polynomial time Turing-reducible to H. That is to say, L can be solved in polynomial time by an oracle machine with an oracle for H;

4. NP-complete—A decision problem C is NP-complete if it is complete for NP, meaning that:
  (a) it is in NP and
  (b) it is NP-hard,
i.e., every other problem in NP is reducible to it. "Reducible" means that for every problem L, there is a polynomial-time many-one reduction, a deterministic algorithm which transforms instances I∈L into instances c∈C, such that the answer to c is YES if and only if the answer to I is YES. To prove that an NP problem A is in fact an NP-complete problem it is sufficient to show that an already known NP-complete problem reduces to A.

Decision problems have binary outcomes. Problems in NP are computation problems for which there exists a polynomial time verification. That is, it takes no more than polynomial time (class P) in the size of the problem to verify a potential solution. It may take more than polynomial time, however, to find a potential solution. NP-hard problems are at least as hard as any problem in NP.

Optimization problems are problems for which one or more objective functions are minimized or maximized over a set of variables, sometimes subject to a set of constraints. For example, the Traveling Salesman Problem ("TSP") is an optimization problem where an objective function representing, for example, distance or cost, must be optimized to find an itinerary, which is encoded in a set of variables representing the optimized solution to the problem. For example, given a list of locations, the problem may consist of finding the shortest route that visits all locations exactly once. Other examples of optimization problems include Quadratic Unconstrained Binary Optimization, such as Maximum Independent Set, integer programming, constraint optimization, factoring, prediction modeling, and k-SAT. These problems are abstractions of many real-world optimization problems, such as operations research, financial portfolio selection, scheduling, supply management, circuit design, and travel route optimization. Many large-scale decision-based optimization problems are NP-hard. See e.g., "*A High-Level Look at Optimization: Past, Present, and Future*" e-Optimization.com, 2000.

Simulation problems typically deal with the simulation of one system by another system, usually over a period of time. For example, computer simulations can be made of business processes, ecological habitats, protein folding, molecular ground states, quantum systems, and the like. Such problems often include many different entities with complex interrelationships and behavioral rules. In Feynman it was suggested that a quantum system could be used to simulate some physical systems more efficiently than a UTM.

Many optimization and simulation problems are not solvable using UTMs. Because of this limitation, there is need in the art for computational devices capable of solving computational problems beyond the scope of UTMs. In the field of protein folding, for example, grid computing systems and supercomputers have been used to try to simulate large protein systems. See Shirts et al., 2000, *Science* 290, pp. 1903-1904, and Allen et al., 2001, *IBM Systems Journal* 40, p. 310. The NEOS solver is an online network solver for optimization problems, where a user submits an optimization problem, selects an algorithm to solve it, and then a central server directs the problem to a computer in the network capable of running the selected algorithm. See e.g., Dolan et al., 2002, *SIAM News* Vol. 35, p. 6. Other digital computer-based systems and methods for solving optimization problems can be found, for example, in Fourer et al., 2001, *Interfaces* 31, pp. 130-150. All these methods are limited, however, by the fact they utilize digital computers, which are UTMs, and accordingly, are subject to the limits of classical computing that impose unfavorable scaling between problem size and solution time.

BRIEF SUMMARY

A system operable to solve Quadratic Unconstrained Binary Optimization problems may be summarized as a plurality of physical qubits, each of the physical qubits having a respective bias operable to supply the physical qubit with up to six differentiable inputs to solve a Quadratic Unconstrained Binary Optimization problem, and a plurality of qubit couplers, each of the qubit couplers selectively operable to couple a respective pair of the physical qubits, wherein a first number of the physical qubit couplers are operated as intra-logical qubit couplers where each of the first number of the physical qubit couplers have a first respective coupling strength that ferromagnetically couples a first respective pair of the physical qubits as a logical qubit, where each logical qubit represents a variable from the Quadratic Unconstrained Binary Optimization problem, and a second number of the physical qubit couplers are operated as inter-logical qubit couplers, wherein each of the second number of the physical qubit couplers have a second respective coupling strength that controllably couples a second respective pair of the physical qubits, where each of the physical qubits in the pair is part of different ones of the logical qubits.

The physical qubits may be superconducting flux qubits. The respective coupling strength may be at least one of an about zero coupling strength and a ferromagnetic coupling strength. The respective bias may control a tunneling rate of each of the physical qubits. The respective bias may control a height of a potential barrier between a first state and a second state of the physical qubit. Decreasing the height of the potential barrier may allow a state of the physical qubit to change from the first state to the second state. Increasing the height of the potential barrier may ensure a state of the physical qubit does not change from the first state to the second state. At least two variables from the Quadratic Unconstrained Binary Optimization problem may be assigned to two respective logical qubit. Each of the respective logical qubits may include at least two of the physical qubits coupled by at least one of the physical qubit couplers. Each pair from the at least two variables may have a relationship in the Quadratic Unconstrained Binary Optimization problem which is represented by a respective controllable coupling between a respective physical qubit from each of the respective logical qubits. Each respective controllable coupling may be produced by a respective physical coupler from the second number of physical qubit couplers. At least one physical coupler may be capable of producing at least one of an about zero coupling, a ferromagnetic coupling, an anti-ferromagnetic coupling and a transverse coupling. Each physical qubit in the plurality of physical qubits may have a number of qubit couplers coupling each physical qubit to the number of other physical qubits in the plurality of physical qubits. The number may be three. The number may be greater than three. Each physical qubit may be degree-3. The plurality of physical qubits and the plurality of qubit couplers may form an interconnected topology. The interconnected topology may be a geometric graph. The Quadratic Unconstrained Binary Optimization problem may be embedded onto a subset of the geometric graph. Determining the lowest energy state of the subset may correspond to a solution to the Quadratic Unconstrained Binary Optimization problem. The at least one of the up to six differentiable inputs may be selected from the group consisting of: an about zero energy, an amount of energy, a standard unit of energy in addition to the amount of energy, the standard unit of energy in addition to the amount of energy with a negative magnitude, the standard unit of energy in addition to twice the amount of energy, and the standard unit of energy in addition to thrice the amount of energy. The predetermined amount of flux may be determined by making measurements of at least one of the qubit couplers. The amount of flux may be a parameter dependent upon the Quadratic Unconstrained Binary Optimization problem.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
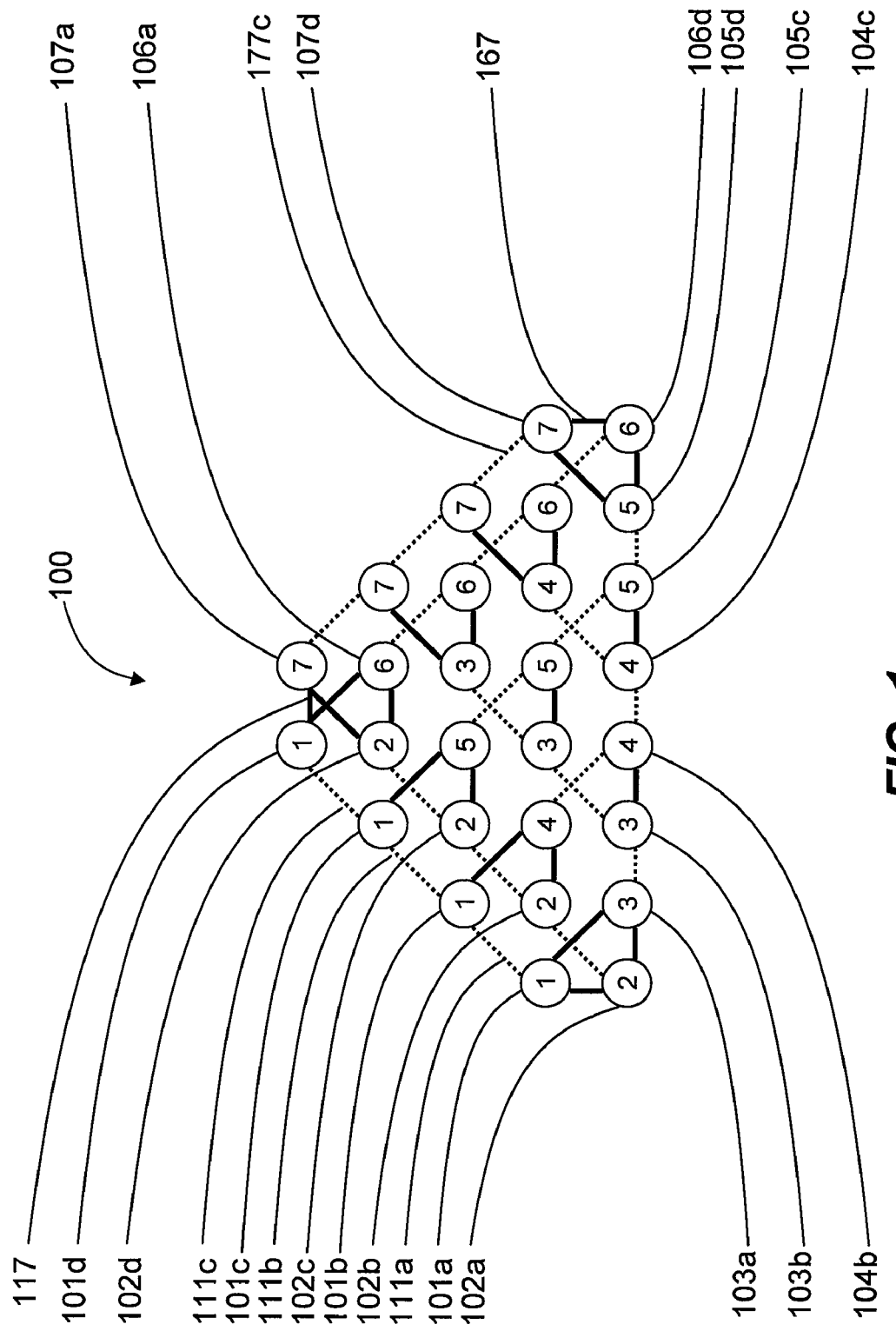
FIG. 1 is a functional diagram showing systems for solving computational problems according to one illustrative embodiment of the present systems, devices and methods.

Analog processing is inherently susceptible to noise. The connection between low- and high-frequency noise and its affect on superconducting quantum systems has been examined in Shnirman et al., Physics Review Letters, 94, 127002 (2005). The presence of 1/f flux noise in superconducting devices (f is frequency) is discussed in Koch et al., arXiv: cond-mat/0702025v2 (2007). Decoherence properties of adiabatic quantum computation, and in general low-frequency noise, is discussed in Amin et. al., arXiv:0708.0384v1 (2007).

Defects, within the integrated circuits upon which analog circuitry is implanted, produce noise. As seen in Koch, et al., arXiv:cond-mat/0702025v2 (2007), by reducing the loop size of a SQUID or superconducting qubit loop the total noise affecting the SQUID or qubit decreases in proportion to the size of the loop. And the measured total noise has been observed to increase with the size of superconducting devices.

Quantum entanglement is a quantum mechanical phenomenon in which the quantum states of two or more objects, such as qubits, have to be described with reference to each other, even though the individual objects may be spatially separated. Quantum computers comprise a plurality of interconnected qubits which exploit entanglement to derive speedups in computational time over classical or digital computers. Entangling each logical qubit within a quantum computer with all other logical qubit within the quantum computer is seen to provide benefits to the quantum computer in the form of increased computational power. For further discussion of interconnected processor topologies, see e.g., U.S. Patent Publication No. 2006/0225165 and U.S. Patent Publication No. 2008/0176750.

Every coupler added to a qubit increases the geometric area the qubit occupies. Reducing the number of couplers per qubit may be useful in reducing noise. To ensure noise is minimized, the size of superconducting devices may be reduced by limiting the number of devices, such as couplers, each superconducting device contains.

Quadratic Unconstrained Binary Optimization (QUBO) problems are a class of problems defined as:

$$\max E(\{x_i\}) = \sum_i a_i x_i + \sum_{i<j} b_{ij} x_i x_j$$

where $E(\{x_i\})$ is a function being maximized, $x_i$ and $x_j$ are binary numbers, and $a_i$ and $b_{ij}$ are real numbers. Maximum Independent Set is a special case of QUBO.

The minimum number of couplers required by each qubit to still allow for the creation of fully interconnected topologies is three. According to Johnson et al., "What are the least tractable instances of max independent set?", Proceedings of the Tenth Annual ACM-SIAM Symposium on Discrete Algorithms, Society for Industrial and Applied Mathematics, 927-928 (1999), given an initial graph a new topological graph in a topological space of maximum degree-3 can be created through a reduction process in O(m) time such that there is a one-to-one correspondence between the Maximum Independent Set (MIS) in the initial graph and the MIS in the new topological graph. The MIS in the new topological graph can be converted to an MIS in the initial graph in O(m) time. MIS problems, or the set of vertices in a graph where no two of which are adjacent and such that adding any other node to the set forces the set to contain an edge, are NP-hard.

Topologies or layouts for analog computing may be geometric, wherein the vertices or edges are associated with geometric objects or configurations, as opposed to topological spaces. To solve the new topological graph on an analog computer, the new topological graph, defined by a set of vertices and a set of edges between the vertices, would need to be embedded into a geometric graph. After the creation of the new topological graph, a further step of embedding or laying out the new topological graph would be completed before use of the new topological graph as a hardware architecture.

Reduction and embedding may be combined into one step and efficiently computed. Rather than completing first a reduction of a problem graph to produce a degree-3 topological graph and then completing embedding the degree-3 topological graph to produce a geometric graph, a transformation of the problem graph may be completed thereby transforming the problem graph into a geometric graph or layout representing an analog computing architecture.

FIG. 1 shows an embodiment of a layout 100 for an analog computer. In layout 100 there are seven logical qubits and each logic qubit in layout 100 is represented as four physical qubits, each physical qubit being of degree-3. The degree of a physical qubit refers to the number of other physical qubits each physical qubit is coupled to.

Logical qubit 1 is represented in layout 100 as physical qubits 101a-101d. Logical qubit 2 is represented in layout 100 as physical qubits 102a-102d. Similarly, logical qubits 3 to 7 are represented in layout 100 as physical qubits as is shown in FIG. 1. Logical qubits may be used to represent one variable from a problem to be solved by the analog computer over several physical qubits. While embedding one variable per physical qubit would decrease the complexity required by layout 100, the number of couplers required per physical qubit would increase the complexity of each physical qubit due to the high number of couplers each physical qubit would have. This increased complexity would result in higher noise measurements from each of the high-connectivity physical qubits.

In some embodiments of the present systems, devices and methods there exists intra-logical qubit couplers ferromagnetically coupling physical qubits of respective logical qubits. Intra-logical qubit couplers 111a-111c are shown in layout 100 ferromagnetically coupling four physical qubits which represent logical qubit 1. There exist three intra-qubit couplers for each respective logical qubit in layout 100, and each set of three intra-logical qubit couplers ferromagnetically couple four respective physical qubits which represent each respective logical qubit. Intra-logical qubit couplers are shown as broken black lines between physical qubits in layout 100.

Intra-logical qubit couplers may be used to ensure that the quantum state of each physical qubit in each respective logical qubit is the same. Analog computers minimize the amount of energy within its constituent components. Ferromagnetic coupling between a pair of physical qubits ensures that if both coupled physical qubits are not the same state then an energy penalty will exist.

In some embodiments there exist intra-logical qubit couplers which controllably couple pairs of physical qubits. Intra-logical qubit couplers may be capable of producing at least one of a strong ferromagnetic coupling, a ferromagnetic coupling, anti-ferromagnetic coupling, transverse coupling and an about zero coupling.

Intra-logical qubit couplers may utilize strong ferromagnetic couplings in the present systems, devices and methods. Strong ferromagnetic couplings are created by weighting the coupling state of a coupling device between two physical qubits to a large ferromagnetic value thereby ensuring the two physical qubits coupled will exist in the same state.

Inter-logical qubit couplers exist between pairs of physical qubits to allow for efficient embedding of problems onto analog processors.

In some embodiments there exist inter-logical qubit couplers which controllably couple pairs of physical qubits. Inter-logical qubit couplers may be capable of producing at least one of a ferromagnetic coupling, anti-ferromagnetic coupling, transverse coupling and a zero coupling.

An inter-logical qubit coupler 117 allows for controllable coupling between physical qubit 101d of logical qubit 1 and physical qubit 107a of logical qubit 7. An inter-logical qubit coupler 167 allows for controllable coupling between physical qubit 106d of logical qubit 6 and physical qubit 107d of logical qubit 7. There exists an inter-logical qubit coupler between a physical qubit from each respective logical qubit and a physical qubit from each other respective logical qubit in layout 100 and are shown as solid black lines between physical qubits. In some embodiments at least one of the inter-logical qubit couplers may not be present.

In some embodiments of the present systems, devices and methods intra-qubit couplers have the same structure as inter-qubit couplers. In some embodiments of the present systems, devices and methods intra-qubit couplers are devices which are dissimilar to devices which are inter-qubit couplers.

For further discussion of inter-logical qubit couplers and intra-logical qubit couplers, see e.g., Harris et al., "Sign- and Magnitude-Tunable Coupler for Superconducting Flux Qubits", Physical Review Letters 98 (2007) 177001, van der Brink et al., "Mediated tunable coupling of flux qubits," New Journal of Physics 7 (2005) 230, U.S. patent Ser. No. 12/017,995 and U.S. patent Ser. No. 12/238,147.

In some embodiments each physical qubit may be of degree-greater-than-3, such as degree-4.

One of skill in the art will appreciate layout 100 is scalable. Additional logical qubits may be added to layout 100 which would subsequently require the addition of additional physical qubits, intra-logical qubit couplers and inter-logical qubit couplers to layout 100 as it is illustrated in FIG. 1.

Figure 2:
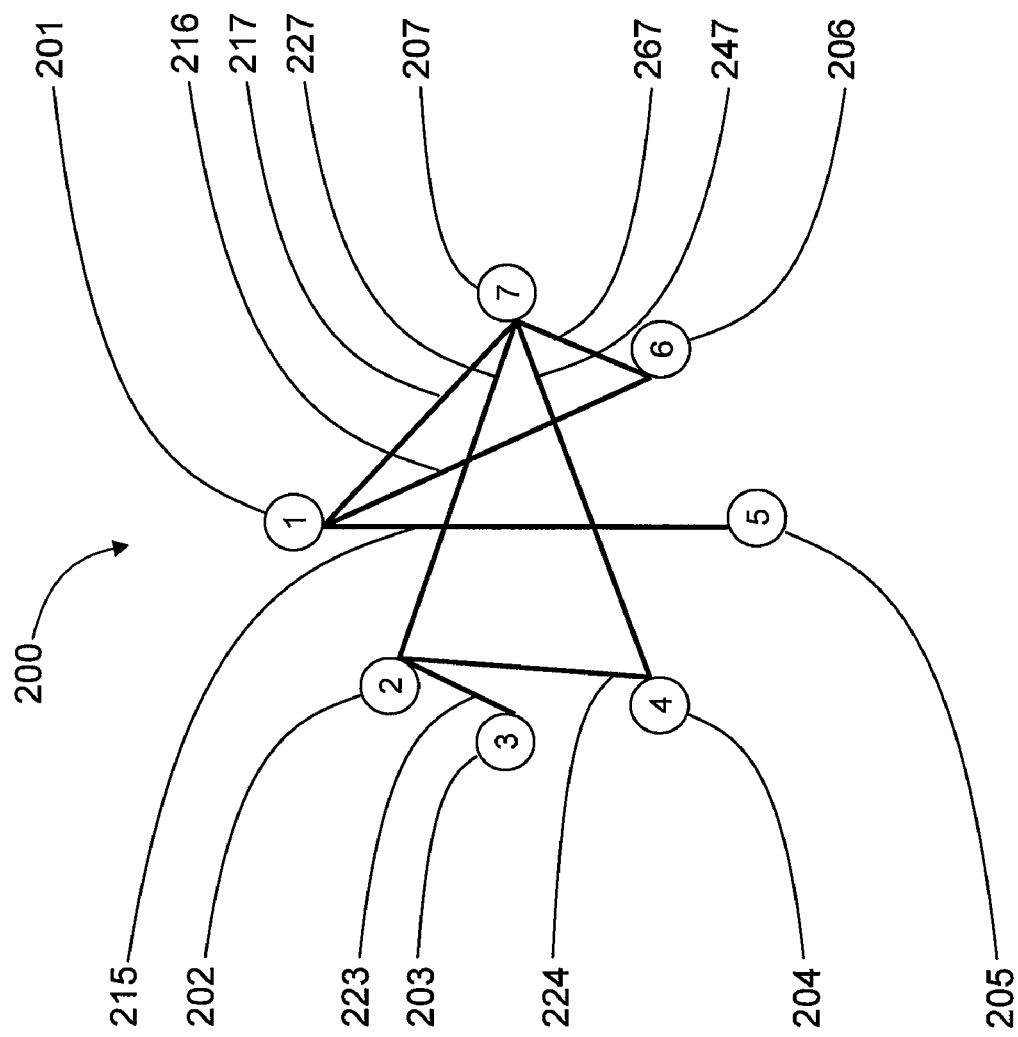
FIG. 2 is a diagram of a source graph according to one illustrative embodiment of the present systems, devices and methods.

FIG. 2 shows a source graph 200 which may be described as G=(V,E) with nodes or vertices V={1,2,3,4,5,6,7} and edges E={(1,5),(1,6),(1,7),(2,3),(2,4),(2,7),(4,7),(6,7)}, and wherein each of the seven nodes in the source graph is connected to at least one other node in the source graph by an edge and wherein the source graph can be embedded into a subgraph of layout 100 of FIG. 1.

Each node 201 to 207 is represented by up to four respective physical qubits and three intra-logical qubit couplers such as the physical qubits 101a-101d to 107a-107d and three respective intra-logical qubit couplers 111a-111c to 177a-177c. Each edge 215, 216, 217, 223, 224, 227, 247, 267 is represented by a corresponding inter-logical qubit coupling.

Figure 3:
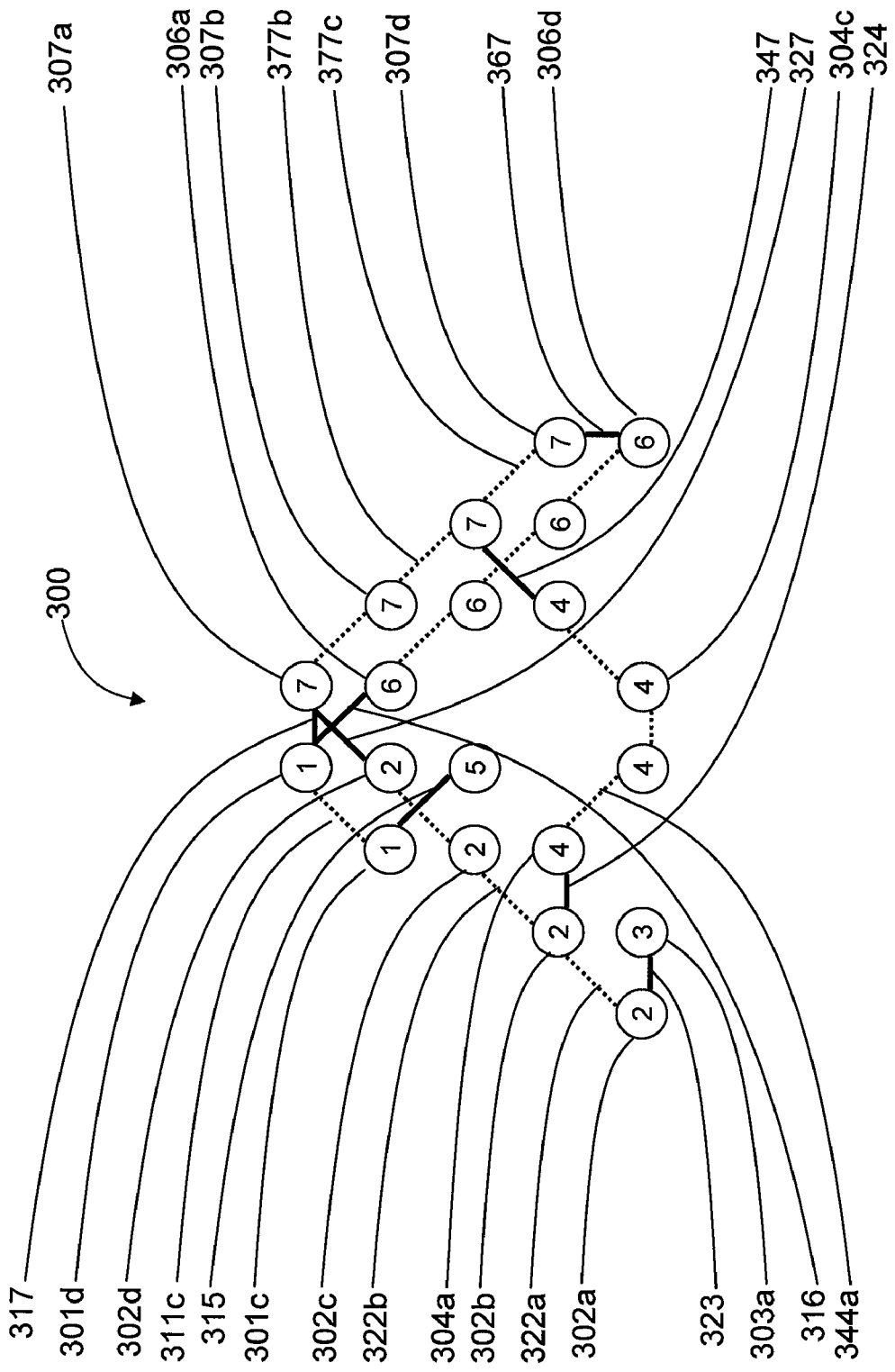
FIG. 3 is a diagram of a layout for solving computational problems according to one illustrative embodiment of the present systems, devices and methods.

FIG. 3 shows a layout 300 of source graph 200. Layout 300 may be geometric. Layout 300 is a subgraph of layout 100.

Node 201 is embedded in logical qubit 1 represented by physical qubits 301c-301d and intra-logical qubit coupler 311c. Node 202 is embedded in logical qubit 2 represented by physical qubits 302a-302d and intra-logical qubit coupler 322a-322c. Similar reductions and embeddings occur for each respective node 203-207 into logical qubits 307 and corresponding physical qubits 303a, 304a-304d, 305a, 306a-306d, 307a-307d, and corresponding intra-logical qubit couplers 332a-332c, 344a-344c, 366a-366c, 377a-377c.

Edges in FIG. 2 are represented in FIG. 3 by inter-logical qubit couplers. Each edge 215, 216, 217, 223, 224, 227, 247, 267 is represented by a corresponding inter-logical qubit coupler 315, 316, 317, 323, 324, 327, 347, 367.

The nature of the coupling between logical qubits facilitated by inter-logical qubit coupler is determined by the problem being solved. In some embodiments, source graph 200 may require at least one of ferromagnetic coupling, anti-ferromagnetic couple, transverse coupling and zero coupling between nodes. Zero couplings may be represented in FIG. 3 by no inter-logical qubit coupler present between a pair physical qubits of representative two logical qubits which do not have an edge connecting their respective nodes in FIG. 2.

Finding the MIS of source graph 200 may be computationally determined by reducing and embedding graph 200 into layout 300 which is a subgraph of layout 100. Physical qubits of layout 100 which are not present in layout 300 may be suppressed in such a way as to ensure the physical qubits do not interfere with the computational determination of the MIS of source graph 200.

One of skill in the art would appreciate other NP-complete problems with geometric subgraphs of layout 100.

Given an input graph G=(V,E), with vertices V and edges E, the input graph can be transformed to a subgraph $G_3 = (V_3, E' \cup E'')$ of layout 100, with a set of degree-3 qubits or nodes or vertices $V_3$, a set of intra-logical qubit couplers or edges E' and a set of inter-logical qubit couplers or edges E', such that the MIS problem of G is reduced to finding the minimum energy of the Ising model Hamiltonian:

$$H = \sum_{i \in V_3} h_i \sigma_i^z + \sum_{ij \in E'} F_{ij} \sigma_i^z \sigma_j^z + \sum_{ij \in E''} J_{ij} \sigma_i^z \sigma_j^z$$

with an analog computer, where $F_{ij}$ is a coupling strength between two qubits corresponding to each intra-logical qubit coupler within E', $J_{ij}$ is an anti-ferromagnetic coupling strength between two qubits and corresponds to each inter-logical qubit coupler within E'' and $h_i$ is a flux bias on each qubit within $V_3$, and $\sigma_i^z$ and $\sigma_j^z$ are z-Pauli matrices. In some embodiments, the flux bias on each qubit within $V_3$ may have a strength of at least one of about zero, c, c−1 and 2c−1. c may equal $J_{MAX}^{AFM}$, the maximum anti-ferromagnetic coupling coupler i,j is capable of producing. In particular, for degree-3 hardware such as layout 100, by setting $J_{ij}=1+\epsilon$, and $F_{ij}=-(1+\epsilon)$ for some $\epsilon>0$ there are 6 different parameter values for the coupler biases $h_i$ of about $-(1+\epsilon)$, zero, $\epsilon$, $1+\epsilon$, $1+2\epsilon$ and $1+3\epsilon$. Having the ability to solve MIS problems by supplying each qubit six differentiable quantities is a useful quality as it reduces the precision required by the analog computer's external circuitry. Also, note the weak ferromagnetic coupling of $F_{ij}$ produced by intra-logical qubit couplers due to the limited number of devices each intra-logical qubit is coupled to.

The analog computer may then find the lowest energy state of layout 300. The analog computer may be a quantum computer. The analog computer may be an adiabatic quantum computer and the analog computer may determine the MIS of graph 200 to be {3, 4, 5, 6}.

Figure 4:
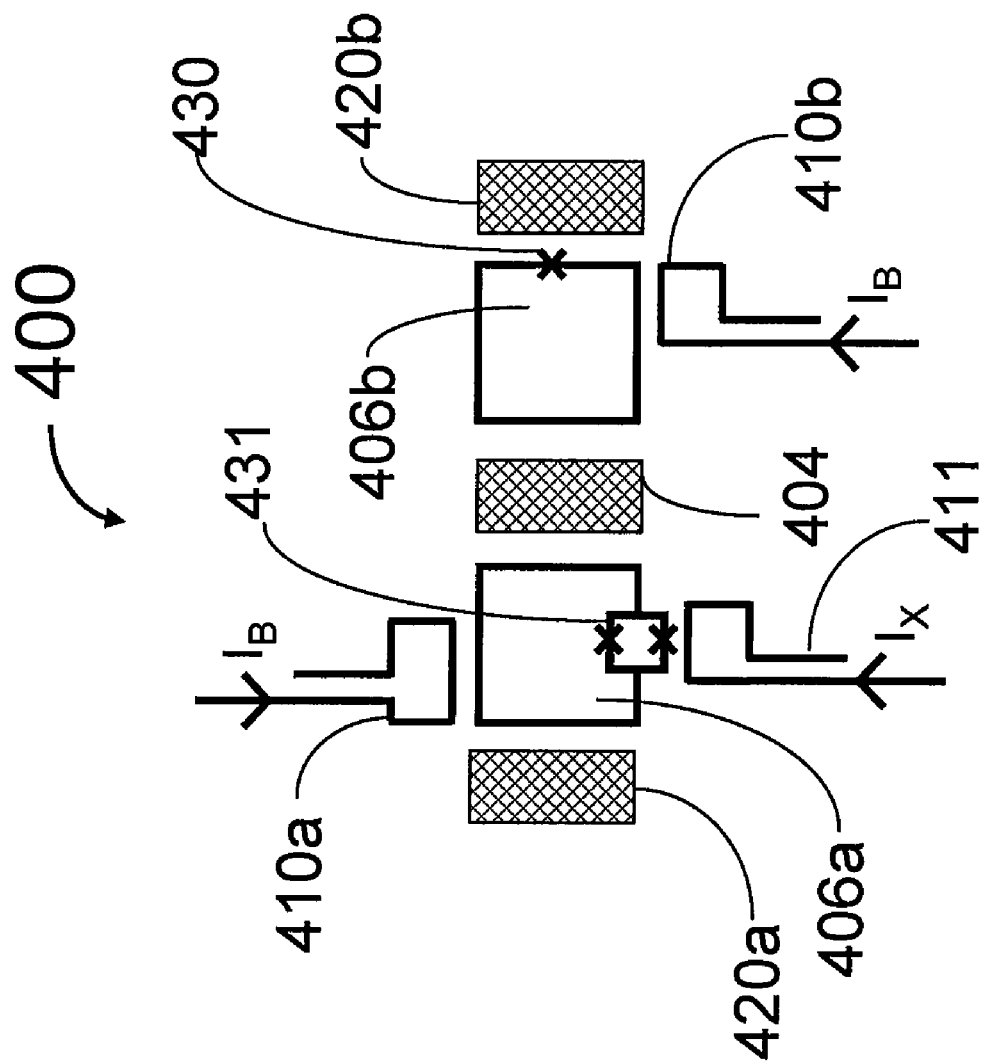
FIG. 4 is a schematic diagram of showing an integrated circuit in accordance with to at least one illustrated embodiment of the present systems, devices and methods.

FIG. 4 illustrates a portion of an integrated circuit on which layout 100 exists. FIG. 4 illustrates two physical qubits, such as physical qubit 101a and physical qubit 101b of FIG. 1 on an integrated circuit 400. Integrated circuit 400 includes superconducting nodes 406a and 406b, which corresponds to two physical qubits 101a and 101b of FIG. 1. Integrated circuit 400 further includes bias devices 410a and 410b as well as readout devices 420a and 420b respectively, and a coupling device 404, which corresponds to intra-logical qubit coupler 111a of FIG. 1. In other embodiments, superconducting nodes 406a and 406b may represent physical qubits 101a and 102b of FIG. 1 and coupling device 404 may represent inter-logical qubit coupler 112 of FIG. 1.

In FIG. 4, nodes 406a and 406b, each rf-SQUIDs, may include a single Josephson junction 430, or a compound Josephson junction 431. The compound Josephson junction 431 can also be described as a dc-SQUID interrupting a superconducting loop. Magnetic flux can then be applied to the compound Josephson junction 431 to provide an extra degree of modulation of the node parameters. Specifically, the tunneling rate of the quantum device (superconducting node 406a) can be adjusted by varying the current supplied by device 411.

Nodes 406a and 406b may be three Josephson junction qubits. Such structures comprise a superconducting loop interrupted by three Josephson junctions. Nodes 406a and 406b in integrated circuit 400 each have two states that correspond to the two possible directions of current or supercurrent flow in their respective superconducting loops. For instance, a first state of node 406a and of 406b is represented by clockwise circulating current and a second state is represented by counter-clockwise circulating current in their respective superconducting loops. The circulating currents corresponding to each of the states characterize distinct magnetic fields generated by such circulating currents.

Readout devices 420a and 420b and coupling device 404 are illustrated in FIG. 4 with the same shaded box because, in some embodiments, they are the same type of device, having similar structure and components, but configured to perform different functions in integrated circuit 400. For example, coupling device 404 can be a dc-SQUID configured to tunably couple nodes 406a and 406b. Coupling device 404 may be monostable, meaning it only has one potential minimum. Readout devices 420a and 420b may be dc-SQUIDs inductively coupled to corresponding nodes and configured to controllably detect the current in such nodes. Alternatively, readout devices 420a and 420b may be any device capable of detecting the state of corresponding nodes 406a and 406b.

Bias devices 410a and 410b are illustrated in FIG. 4 as loops of metal. A local magnetic field can be applied to the corresponding node from a bias device 410a or 410b by driving a current through the loop of the bias device. Bias devices 410a and 410b may be made of metals that are superconducting at low temperatures, such as aluminum and niobium. The bias devices may not be loops, but simply wires that pass near corresponding nodes 406a and 406b thereby coupling magnetic flux into the loops. Each bias device 410a and 410b may comprise a wire that passes near a corresponding node, then connects to another metal layer, such as a ground plane, on the chip using a via.

Integrated circuit 400 may be part of an analog computer, and the analog computer may use the natural physical evolution of the coupled qubits 404a and 404b which are manipulated by the control circuitry of the analog computer to solve a problem corresponding to a MIS problem. Starting from a known initial Hamiltonian, the guided physical evolution of integrated circuit 400 may be completed, so that the final state of the system contains information relating to a solution of the MIS problem.

Figure 5:
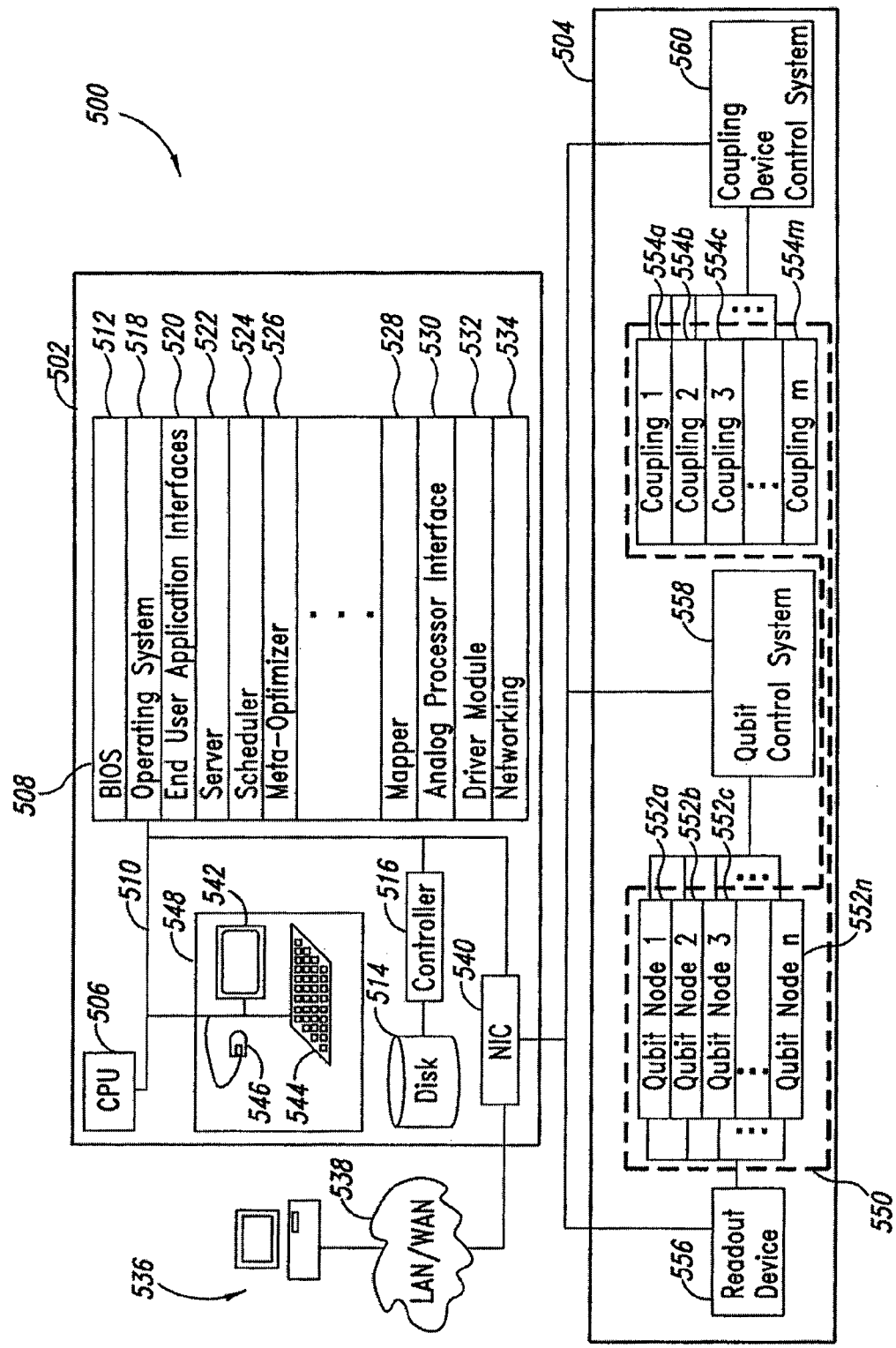
FIG. 5 is a functional block diagram showing a computing system employing at least one analog processor in accordance with to at least one illustrated embodiment of the present systems, devices and methods.

FIG. 5 and the following discussion provide a brief and general description of a suitable computing environment in which various embodiments of the analog computer. Although not required, embodiments will be described in the general context of computer-executable instructions, such as program application modules, objects or macros being executed by a computer. Those skilled in the relevant art will appreciate that the disclosed systems, methods and articles can be practiced with other computing system configurations, including hand-held devices, multiprocessor systems, microprocessor-based or programmable consumer electronics, personal computers ("PCs"), network PCs, mini-computers, mainframe computers, and the like. The embodiments can be practiced in distributed computing environments where tasks or modules are performed by remote processing devices, which are linked through a communications network. In a distributed computing environment, program modules may be located in both local and remote memory storage devices.

FIG. 5 shows a computing system 500 operable to solve problems, according to one illustrated embodiment.

The computing system 500 includes a digital computing subsystem 502 and an analog computing subsystem 504 communicatively coupled to the digital computing subsystem 502.

The digital computing subsystem 502 includes one or more processing units 506, system memories 508, and system buses 510 that couple various system components including the system memory 508 to the processing unit 506. The digital computing subsystem 502 will at times be referred to in the singular herein, but this is not intended to limit the application to a single digital computing subsystem 502 since in typical embodiments, there will be more than one digital computing subsystem 502 or other device involved. Other computing systems may be employed, such as conventional and personal computers, where the size or scale of the system allows. The processing unit 506 may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 5 are of conventional design. As a result, such blocks need not be described in further detail herein, as they will be understood by those skilled in the relevant art.

The system bus 510 can employ any known bus structures or architectures, including a memory bus with memory controller, a peripheral bus, and a local bus. The system memory 508 may include read-only memory ("ROM") and random access memory ("RAM"). A basic input/output system ("BIOS") 512, which can form part of the ROM, contains basic routines that help transfer information between elements within the digital computing subsystem 502, such as during startup.

The digital computing subsystem 502 also includes non-volatile memory 514. The non-volatile memory 514 may take a variety of forms, for example a hard disk drive for reading from and writing to a hard disk, and an optical disk drive and a magnetic disk drive for reading from and writing to removable optical disks and magnetic disks, respectively. The optical disk can be read by a CD-ROM, while the magnetic disk can be a magnetic floppy disk or diskette. The hard disk drive, optical disk drive and magnetic disk drive communicate with the processing unit 506 via the system bus 510. The hard disk drive, optical disk drive and magnetic disk drive may include appropriate interfaces or controllers 516 coupled between such drives and the system bus 510, as is known by those skilled in the relevant art. The drives, and their associated computer-readable media, provide non-volatile storage of computer readable instructions, data structures, program modules and other data for the digital computing subsystem 502. Although the depicted digital computing subsystem 502 has been described as employing hard disks, optical disks and/or magnetic disks, those skilled in the relevant art will appreciate that other types of non-volatile computer-readable media that can store data accessible by a computer may be employed, such a magnetic cassettes, flash memory cards, digital video disks ("DVD"), Bernoulli cartridges, RAMs, ROMs, smart cards, etc.

Various program modules or application programs and/or data can be stored in the system memory 508. For example, the system memory 508 may store an operating system 518, end user application interfaces 520, server applications 522, scheduler modules 524, and/or meta-optimizer modules 526. Also for example, the system memory 508 may additionally or alternatively store one or more mapper modules 528, analog processor interface modules 530, and/or driver modules 532. The operation and function of these modules are discussed in detail below.

The system memory 508 may also include one or more networking applications 534, for example a Web server application and/or Web client or browser application for permitting the digital computing subsystem 502 to exchange data with sources via the Internet, corporate Intranets, or other networks as described below, as well as with other server applications on server computers such as those further discussed below. The networking application 534 in the depicted embodiment is markup language based, such as hypertext markup language ("HTML"), extensible markup language ("XML") or wireless markup language ("WML"), and operates with markup languages that use syntactically delimited characters added to the data of a document to represent the structure of the document. A number of Web server applications and Web client or browser applications are commercially available such those available from Mozilla and Microsoft.

While shown in FIG. 5 as being stored in the system memory 508, the operating system 518 and various applications 520, 522, 524, 526, 528, 530, 532, 534 and/or data can be stored on the hard disk of the hard disk drive, the optical disk of the optical disk drive and/or the magnetic disk of the magnetic disk drive.

The digital computing subsystem 502 can operate in a networked environment using logical connections to one or more end user computing systems 536 (only one shown), such as one or more remote computers or networks. The digital computing subsystem 502 may be logically connected to one or more end user computing systems 536 under any known method of permitting computers to communicate, for example through a network 538 such as a local area network ("LAN") and/or a wide area network ("WAN") including, for example, the Internet. Such networking environments are well known including wired and wireless enterprise-wide computer networks, intranets, extranets, and the Internet. Other embodiments include other types of communication networks such as telecommunications networks, cellular networks, paging networks, and other mobile networks. The information sent or received via the communications channel may, or may not be encrypted. When used in a LAN networking environment, the digital computing subsystem 502 is connected to the LAN through an adapter or network interface card 540 (communicative linked to the system bus 510). When used in a WAN networking environment, the digital computing subsystem 502 may include an interface and modem (not shown) or other device, such as the network interface card 540, for establishing communications over the WAN/Internet.

In a networked environment, program modules, application programs, or data, or portions thereof, can be stored in the digital computing subsystem 502 for provision to the networked computers. In one embodiment, the digital computing subsystem 502 is communicatively linked through the network 538 with TCP/IP middle layer network protocols; however, other similar network protocol layers are used in other embodiments, such as user datagram protocol ("UDP"). Those skilled in the relevant art will readily recognize that the network connections shown in FIG. 5 are only some examples of establishing communications links between computers, and other links may be used, including wireless links.

While in most instances the digital computing subsystem 502 will operate automatically, where an end user application interface is provided, an operator can enter commands and information into the digital computing subsystem 502 through the end user application interface 548 including input devices, such as a keyboard 544, and a pointing device, such as a mouse 546. Other input devices can include a microphone, joystick, scanner, etc. These and other input devices are connected to the processing unit 506 through the end user application interface 520, such as a serial port interface that couples to the system bus 510, although other interfaces, such as a parallel port, a game port, or a wireless interface, or a universal serial bus ("USB") can be used. A monitor 542 or other display device is coupled to the bus 510 via a video interface, such as a video adapter (not shown). The digital computing subsystem 502 can include other output devices, such as speakers, printers, etc.

The analog computing subsystem 504 includes an analog processor, for example, a quantum processor 550. The quantum processor 550 includes multiple qubit nodes 552a (collectively 552) and multiple coupling devices 554a—(collectively 554).

The analog computing subsystem 504 includes a readout device 556 for reading out one or more qubit nodes 552. For example, readout device 556 may include multiple dc-SQUID magnetometers, with each dc-SQUID magnetometer being inductively connected to a qubit node 552 and NIC 540 receiving a voltage or current from readout device 556. The dc-SQUID magnetometers comprise a loop of superconducting material interrupted by two Josephson junctions and are well known in the art.

The analog computing subsystem 504 also includes a qubit control system 558 including controller(s) for controlling or setting one or more parameters of some or all of the qubit nodes 552. The analog computing subsystem 504 further includes a coupling device control system 560 including coupling controller(s) for coupling devices 554. For example, each coupling controller in coupling device control system 560 may be capable of tuning the coupling strength of a coupling device 554 between a minimum and a maximum value. Coupling devices 554 may be tunable to provide ferromagnetic or anti-ferromagnetic coupling between qubit nodes 552.

Where computing system 500 includes a driver module 532, the driver module 532 may include instructions to output signals to quantum processor 550. NIC 540 may include appropriate hardware required for interfacing with qubit nodes 552 and coupling devices 554, either directly or through readout device 556, qubit control system 558, and/or coupling device control system 560. Alternatively, NIC 540 may include software and/or hardware that translate commands from driver module 532 into signals (e.g., voltages, currents, optical signals, etc.) that are directly applied to qubit nodes 552 and coupling devices 554. In another alternative, NIC 540 may include software and/or hardware that translates signals (representing a solution to a problem or some other form of feedback) from qubit nodes 552 and coupling devices 554. In some cases, analog processor interface module 530 may communicate with driver module 532 rather than directly with NIC 540 in order to send and receive signals from quantum processor 550.

The functionality of NIC 540 can be divided into two classes of functionality: data acquisition and control. Different types of chips may be used to handle each of these discrete functional classes. Data acquisition is used to measure the physical properties of qubit nodes 552 after quantum processor 550 has completed a computation. Such data can be measured using any number of customized or commercially available data acquisition micro-controllers including, but not limited to, data acquisition cards manufactured by Elan Digital Systems (Fareham, UK) including the AD132, AD136, MF232, MF236, AD142, AD218 and CF241 cards. Alternatively, data acquisition and control may be handled by a single type of microprocessor, such as the Elan D403C or D480C. There may be multiple NICs 540 in order to provide sufficient control over qubit nodes 552 and coupling devices 554 and in order to measure the results of a computation conducted on quantum processor 550.

Coupling devices 554 may either couple qubits 552 together ferromagnetically or anti-ferromagnetically or not couple qubits 552 together. A ferromagnetic coupling between two qubits 552 drives the qubits 552 to have the same state, whereas an anti-ferromagnetic coupling drives the qubits 552 to have opposite states. Charge-based coupling devices 554 may also be used. More information on coupling devices 554 useful in the present systems, methods and articles can be found in U.S. patent application Ser. No. 11/247,857.

The analog computing subsystem 504 may be a superconducting quantum computer, examples of which include qubit registers, readout devices and ancillary devices. Superconducting quantum computers normally are operated at milliKelvin temperatures and often are operated in a dilution refrigerator. An example of a dilution refrigerator is the Leiden Cryogenics B.V. MNK 126 series (Galgewater No. 21, 2311 VZ Leiden, The Netherlands). All or part of the components of the analog computing subsystem 504 may be housed in the dilution refrigerator. For example, qubit control system 558 and coupling device control system 560 may be housed outside the dilution refrigerator with the quantum processor 550 being housed inside the dilution refrigerator.

Superconducting qubits useful in the present systems, methods and articles include superconducting flux qubits and superconducting charge qubits, both described in Makhlin et al., 2001, *Reviews of Modern Physics* 73, pp. 357-400. Examples of flux qubits that can be used include rf-SQUIDs, which have a superconducting loop interrupted by a Josephson junction, and persistent current qubits, which have a superconducting loop interrupted by three Josephson junctions. See Mooij et al., 1999, *Science* 285, 1036; and Orlando et al., 1999, *Phys. Rev. B* 60, 15398. Other examples of superconducting qubits can be found in Il'ichev et al., 2003, *Phys. Rev. Lett.* 91, 097906; Blatter et al., 2001, *Phys. Rev. B* 63, 174511; and Friedman et al., 2000, *Nature* 406, 43. In addition, hybrid charge-phase qubits may also be used, and examples of hybrid qubits can be found in U.S. Pat. No. 6,838,694 and U.S. Pat. No. 7,335,909, referred to above.

Superconducting coupling devices useful in the present systems, methods and articles include rf-SQUIDs and dc-SQUIDs, which couple qubits together by flux. As described previously, SQUIDs have a superconducting loop interrupted by one (an rf-SQUID) or two (a dc-SQUID) Josephson junctions. In some cases, the coupling devices used may be capable of both ferromagnetic and anti-ferromagnetic coupling.

The readout devices 556, may also be superconducting devices, such as a dc-SQUID, or instead, a tank circuit may be used for the readout devices 556. The readout devices 556 may read out the state of a qubit 552 in the flux regime, or alternatively, read out the state of the qubit in the charge regime. Charge-based readout devices and charged-based local bias devices may be used.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to combined superconducting magnetic shielding and radiation shielding systems, methods and apparatus, not necessarily the exemplary combined superconducting magnetic shielding and radiation shielding systems, methods, and apparatus generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A system operable to solve Quadratic Unconstrained Binary Optimization problems, the system comprising:
   a plurality of physical qubits, each of the physical qubits having a respective bias operable to supply the physical qubit with inputs to solve a Quadratic Unconstrained Binary Optimization problem; and
   a plurality of physical qubit couplers, each of the physical qubit couplers selectively operable to couple a respective pair of the physical qubits, wherein
   a first number of the physical qubit couplers are operated as intra-logical qubit couplers where each of the first number of the physical qubit couplers have a respective coupling strength that ferromagnetically couples a respective pair of the physical qubits as a logical qubit, where each logical qubit represents a variable from the Quadratic Unconstrained Binary Optimization problem; and
   a second number of the physical qubit couplers are operated as inter-logical qubit couplers, wherein each of the second number of the physical qubit couplers have a respective coupling strength that controllably couples a respective pair of the physical qubits, where each of the physical qubits in the pair is part of different ones of the logical qubits and wherein at least two variables from the Quadratic Unconstrained Binary Optimization problem are assigned to two respective logical qubits.

2. The system of claim 1 wherein the physical qubits are superconducting flux qubits.

3. The system of claim 1 wherein the respective coupling strength of each qubit coupler in the second number of the physical qubit couplers is at least one of an about zero coupling strength, an anti-ferromagnetic coupling strength, and a ferromagnetic coupling strength.

4. The system of claim 1 wherein the respective bias controls a tunneling rate of each of the physical qubits.

5. The system of claim 1 wherein the respective bias controls a height of a potential barrier between a first state and a second state of the physical qubit.

6. The system of claim 5 wherein decreasing the height of the potential barrier allows a state of the physical qubit to change from the first state to the second state.

7. The system of claim 5 wherein increasing the height of the potential barrier ensures a state of the physical qubit does not change from the first state to the second state.

8. The system of claim 1 wherein each of the respective logical qubits includes at least two of the physical qubits coupled by at least one of the physical qubit couplers.

9. The system of claim 1 wherein each pair from the at least two variables have a relationship in the Quadratic Unconstrained Binary Optimization problem which is represented by a respective controllable coupling between a respective physical qubit from each of the respective logical qubits.

10. The system of claim 9 wherein each respective controllable coupling is produced by a respective physical coupler from the second number of physical qubit couplers.

11. The system of claim 1 wherein at least one physical coupler is capable of producing at least one of an about zero coupling, a ferromagnetic coupling, an anti-ferromagnetic coupling and a transverse coupling.

12. The system of claim 1 wherein a number of physical qubit couplers coupling each physical qubit to other physical qubits in the plurality of physical qubits is three.

13. The system of claim 1 wherein a number of physical qubit couplers coupling each physical qubit to other physical qubits in the plurality of physical qubits is greater than three.

14. The system of claim 1 wherein each physical qubit is degree-3.

15. The system of claim 1 wherein the plurality of physical qubits and the plurality of physical qubit couplers form an interconnected topology.

16. The system of claim 15 wherein the interconnected topology is a geometric graph.

17. The system of claim 16 wherein the Quadratic Unconstrained Binary Optimization problem is embedded onto a subset of the geometric graph.

18. The system of claim 17 wherein determining the lowest energy state of the subset corresponds to a solution to the Quadratic Unconstrained Binary Optimization problem.

19. The system of claim 1 wherein each of the physical qubits includes a respective bias operable to supply the physical qubit with up to six differentiable inputs to solve a Quadratic Unconstrained Binary Optimization problem.

20. The system of claim 19 wherein the at least one of the up to six differentiable inputs is selected from the group consisting of: an about zero energy, an amount of energy, a standard unit of energy in addition to the amount of energy, the standard unit of energy in addition to the amount of energy with a negative magnitude, the standard unit of energy in addition to twice the amount of energy, and the standard unit of energy in addition to thrice the amount of energy.

21. The system of claim 20 wherein the amount of energy is determined by making measurements of at least one of the physical qubit couplers.

22. The system of claim 20 wherein the amount of energy is a parameter dependent upon the Quadratic Unconstrained Binary Optimization problem.

23. The system of claim 1 wherein the Quadratic Unconstrained Binary Optimization problem is a Maximum Independent Set problem.

24. The system of claim 1 wherein the respective bias is operable to supply the physical qubit with at least four differentiable inputs to solve the Quadratic Unconstrained Binary Optimization problem.

* * * * *